(12) United States Patent
Okajima et al.

(10) Patent No.: US 6,455,136 B1
(45) Date of Patent: Sep. 24, 2002

(54) FILM FOR INK JET RECORDING SHEET

(75) Inventors: Nariaki Okajima, Tokyo (JP); Yoshio Shimizu, Shiga-ken (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/619,280

(22) Filed: Jul. 19, 2000

Related U.S. Application Data

(63) Continuation-in-part of application No. 09/591,729, filed on Jun. 12, 2000, now Pat. No. 6,403,224.

(30) Foreign Application Priority Data

Jun. 15, 1999 (JP) .............................. 11-167934
Jul. 22, 1999 (JP) .............................. 11-207066

(51) Int. Cl.⁷ .............................. B32B 27/14; B32B 3/00
(52) U.S. Cl. .................. 428/195; 428/423.1; 428/480; 428/522
(58) Field of Search .............................. 428/195, 423.1, 428/480, 522

(56) References Cited

U.S. PATENT DOCUMENTS

| | | | | |
|---|---|---|---|---|
| 4,956,230 A | * | 9/1990 | Edwards et al. | 428/341 |
| 6,028,028 A | * | 2/2000 | Nitta | 503/200 |
| 6,127,037 A | * | 10/2000 | Sargeant et al. | 428/411.1 |
| 6,146,770 A | * | 11/2000 | Sargeant et al. | 428/500 |
| 6,165,602 A | * | 12/2000 | Fujita | 428/216 |

FOREIGN PATENT DOCUMENTS

| | | |
|---|---|---|
| EP | 0696516 A1 | 2/1996 |
| EP | 0888902 A1 | 1/1999 |
| EP | 0938979 A3 | 12/1999 |
| EP | 0962330 A3 | 12/1999 |
| EP | 1 000 962 A | 5/2000 |
| JP | 02060941 A | 3/1990 |
| JP | 07242758 A | 9/1995 |

* cited by examiner

*Primary Examiner*—Cynthia H Kelly
*Assistant Examiner*—B. Shewareged
(74) *Attorney, Agent, or Firm*—George W. Neuner; Edwards & Angell, LLP

(57) ABSTRACT

The present invention relates to a film for ink jet recording sheet comprising:
  a polyester film,
  a coating layer on the polyester film formed by applying a coating solution containing a polymer (A) having oxazoline groups on the surface of the polyester film, then drying and stretching the film, and
  an ink jet image receiving layer on the coating layer.

11 Claims, No Drawings

FILM FOR INK JET RECORDING SHEET

CROSS REFERENCE TO RELATED APPLICATION

This is a continuation-in-part of application Ser. No. 09/591,729, filed Jun. 12, 2000 now U.S. Pat. No. 6,403,224.

BACKGROUND OF THE INVENTION

The present invention relates to a film for ink jet recording sheet, more particularly, it relates to a film for ink-jet recording sheet having a novel coating layer with excellent transparency, gross, adhesion to an ink image receiving layer and anti-block properties.

Since stretched polyester films have excellent properties such as mechanical strength, dimensional stability, flatness, smoothness, heat resistance, chemical resistance and transparency, they have been widely used as a base film of magnetic recording medium, a film for printing, magnetic card, synthetic paper, etc.

While the polyester films have such excellent properties, they are poor in adhesion, which is a problem common to the plastic films in general. For instance, the polyester films have poor adhesion to printing inks (printing ink for cellophane, chlorinated PP ink, ultraviolet curing ink, magnetic ink, etc.), thermal transfer ink, magnetic coatings, adhesives (laminating adhesives, wood adhesives, etc.), overcoating materials (releaser, ink image receiving layer, gelatin, polyvinyl alcohol, polyvinyl acetal, cellulose acetate, cellulose butyroacetate, methyl cellulose, carboxymethyl cellulose, etc.), and deposited metals and inorganic materials (aluminum, silver, gold, ITO, silicon oxide, aluminum oxide, etc.). In recent years, attention has been focused especially on aqueous overcoatings (including ink) for lessening environmental contamination. An example of the aqueous overcoatings is an ink jet image receiving layer. In order to receive an aqueous ink, there is provided an image receiving layer on the polyester film. Usually, the said image receiving layer is formed by an aqueous coating solution As a method of solving the above problem, it is known to provide a coating layer on the polyester film surface. Especially the method in which coating is conducted in the course of the film forming process is preferable in view of economic and characteristics thereof. This technique is called "in-line coating." In a typical instance of this method, coating is conducted after longitudinal stretching and before transverse stretching, and then transverse stretching and heat setting are conducted. In-line coating, as compared with the conventional coating method in which coating is conducted outside the film producing process (this method being hereinafter called off-line coating), is capable of thin coating and allows dry heat treatments at high temperatures without impairing flatness of the film. Therefore, even when a coating with high adhesion is achieved, the tendency of the films to stick to each other (so-called blocking or sticking) is attenuated.

Various types of compounds including polyesters, poly (meth)acrylates, polyurethanes, polyvinylidene chloride, polyolefins and silane coupling agents can be used as the coating compounds. Coating with these compounds provides, in many cases, improvement of adhesion in some way or other. However, there are presently available only a few coating formulations which manifest satisfactory adhesion to aqueous overcoatings for forming the ink jet image receiving layer. Also, such undercoat tends to absorb moisture to become sticky.

Incorporation of a crosslinking agent in the coating composition is considered an effective way for reducing stickiness or blocking tendency, but generally addition of a crosslinking agent induces hardening of the coat. So, there arises a problem of a stretching conformability of the coating layer especially when the film is stretched after coating such as mentioned above. More specifically, if the coating layer is poor in stretchability, it fails to be stretched uniformly and may be fractured finely in the polyester film stretching step, thus forming microcracks in the coating layer in many cases. Such cracks in the coating layer cause such defects as reduction of adhesion to the overcoats, etc., and clouding of the coating layer due to scattering of light by fine unevenness of the coating layer surface. Thus, the problem arises that even when the base polyester film is not transparent, glossiness of the film surface lowers. No formulation that can satisfy these contradictory requirements—betterment of transparency and reduction of stickiness—has yet been found.

As a result of the present inventors' earnest studies to solve the above problem, it has been found that the above problem can be solved by a film for ink jet recording sheet comprising a polyester film, a coating layer and an ink jet image receiving layer. The present invention has been attained on the basis of the above finding.

SUMMARY OF THE INVENTION

The object of the present invention is to provide a polyester film with excellent transparency of the coat, surface gross, adhesion to an ink jet image receiving layer and blocking resistance.

To attain the above aim, in an aspect of the present invention, there is provided a film for ink jet recording sheet comprising:

a polyester film, a coating layer on said polyester film formed by applying a coating solution containing a polymer (A) having oxazoline groups on the surface of said polyester film, then drying and stretching the film, and an ink jet image receiving layer on said coating layer.

DETAILED DESCRIPTION OF THE INVENTION

The present invention will be described in detail below.

The film for ink jet recording sheet according to the present invention comprisesat least three layers of a polyester film, a coating layer and an ink jet image receiving layer.

The polyester constituting the polyester film of the present invention is the one obtained by using an aromatic dicarboxylic acid or an ester thereof and a glycol as the main starting materials. Examples of the preferable polyester have not less than 70% of the recurring structural units of ethylene terephthalate units, ethylene-2,6-naphthalate units, 1,4-cyclohexane terephthalate units or ethylene isophthalate units, and are especially preferably polyethylene terephthalate and polyethylene-2,6-naphthalate. It may contain other components as far as the above condition is met.

As the aromatic dicarboxylic acid, it is possible to use, for example, terephthalic acid, 2,6-naphthalenedicarboxylic acid, isophthalic acid, phthalic acid, adipic acid, sebasic acid, oxycarboxylic acids (such as p-oxyethoxybenzoic acid) and the like either singly or as a mixture of two or more of them. As the glycol, ethylene glycol, diethylene glycol, propylene glycol, butanediol, 1,4-cyclohexanedimethanol, neopentyl glycol, polyalkylene glycol and the like can be used either singly or as a mixture of two or more of them.

The intrinsic viscosity of these polyesters is usually not less than 0.45, preferably in the range of 0.50 to 1.0, more preferably 0.52 to 0.80. When the intrinsic viscosity is less than 0.45, there may arise the problems such as reduced productivity in manufacture of the film and reduced mechanical strength of the produced film. On the other hand, it is preferable that the intrinsic viscosity does not exceed 1.0 in view of melt extrusion stability of the polymer.

In the polyester film of the present invention, it is possible to contain the particles in the polyester so as to form appropriate projections on the film surface to provide proper slip characteristics to the film to thereby improving its handling qualities. Examples of such particles usable in the present invention include the inorganic particles such as the particles of calcium carbonate, calcium phosphate, silica, kaolin, talc, titanium dioxide, alumina, barium sulfate, calcium fluoride, lithium fluoride, zeolite, molybdenum sulfide, etc., the organic particles such as the particles of crosslinked polymers, calcium oxalate, etc., and the precipitated particles produced in polyester polymerization.

The size and amount of the particles to be contained in the film in the present invention, although variable depending on the purpose of use of the film, are generally as described below. The average particle size is preferably in the range of 0.005 to 5.0 μm, more preferably 0.01 to 3.0 μm. When the average particle size exceeds 5.0 μm, the film surface is roughened to an excess degree. Also, in a thin film, the insulating performance may deteriorate. Further, the particles become liable to fall off the film surface, causing so-called "drop-off of particles" in use of the film. When the average particle size is less than 0.005 μm, the effect of improving the slip characteristics of the film tends to lower because of insufficient formation of the protrusions by the particles. That is, the effect of improving the slip characteristics may not be provided unless the particles are contained in large quantities, but on the other hand, mechanical properties of the film may be impaired if the particles are added in large quantities.

The content of the particles is preferably not less than 30% by weight, more preferably 0.0001 to 30.0% by weight, still more preferably 0.010 to 20.0% by weight, based on the weight of polyester. When the particle content exceed the above-defined range, mechanical properties of the film may be deteriorated. In view of the use of ink jet, there are various using cases in which high transparency is required, such as OHP film, or white appearance is required, such as white image receiving layer and illumination signboard. In case where the high transparency is required, it is preferred that the particles are contained therein in some amount in view of sliding properties, but the few content of the particles, the preferable in view of the transparency. In case of white image receiving layer, a white pigment such as calcium carbonate or titanium oxide is preferably added in a content of not less than 2% by weigh. This is required in the case of producing a film with a high light-shielding effect; the lower threshold value of the particle content may be smaller in the case of a half-transparent film.

It is possible to contain in the film two or more types of these particles or the particles of the same type but differing in size. In either case, it is preferable that the average size of the particles contained in the film and their total content fall in the above-defined ranges.

In producing the particle-containing polyester, the particles may be added either in the course of the polyester synthesis or directly to the polyester. In case where the particles are added in the course of the polyester synthesis, it is preferable to use a method in which a slurry is formed by dispersing the particles in ethylene glycol or the like, and this slurry is added in a preferable phase of the polyester synthesis. On the other hand, in case where the particles are added directly to the polyester, a method is preferably used in which the dried particles or a slurry thereof formed by dispersing the particles in water or an organic solvent having a boiling point of not more than 200° C. is added and mixed with the polyester by using a double-screw extruder. If necessary, the particles to be added may have been subjected to such treatment(s) as pulverization, dispersion, classification and filtration before addition.

In order to adjust the particle content, a method in which first a master material containing the particles in a high concentration is prepared in the manner described above, and in the film forming process, this master preparation is diluted with a material which is substantially free of the particles to thereby adjust the particle content, is preferably used.

As the additives other than the said protrusion-forming agent, there can be contained as required such materials as antistatic agent, stabilizer, lubricant, crosslinking agent, anti-block agent, antioxidant, colorant (dye and pigment), light screen, ultraviolet absorber, etc. Thus, the polyester film according to the present invention may be, for instance, a colored film or a foamed thin sheet containing a plurality of fine air cells.

The polyester film of the present invention may be of a multi-layer structure as far as the finally satisfied properties of the film satisfy the requirements of the present invention. For instance, it may be a co-extruded laminated film. In this case, the above description relating to the base film applies to the polyester of the outermost surface layer. The films of the other (inner) layers may be made of any type of polyester, plastic material, paper or cloth. Such inner layer films may be, for instance, foamed films containing a plurality of fine air cells.

The polyester film of this invention may be either a monoaxially stretched film or a biaxially stretched film as far as it is a stretched polyester film. However, the biaxially stretched film is more widely used industrially.

Biaxial stretching of the polyester film is preferred by either simultaneous biaxial stretching or successive biaxial stretching, especially successive biaxial stretching is usually used. According to the successive biaxial stretching operation, the melt extruded polyester is cooled on a cooling drum to form a non-stretched film, and the non-stretched film is first stretched in the machine direction (longitudinal stretching) by a set of rolls differing in peripheral speed from each other, and then further stretched while held by a clip in the direction orthogonal to the longitudinal stretching direction. As a modification of this operation, both longitudinal stretching and transverse stretching may be conducted in several stages. Or they may be conducted alternatively until the film is stretched to the desired degree. This technique is used where a high-strength film is produced by a re-stretching method.

Now, the polymer (A) used for the coating composition in the present invention is explained.

The polymers of the oxazoline compounds according to the present invention can be synthesized by using a monomer containing an oxazoline compound as at least one of the starting monomers. As the oxazoline compound, there can be used the 2-oxazoline, 3-oxazoline and 4-oxazoline compounds. Especially the 2-oxazoline compounds are preferable because of highly reactive performance and industrial availability.

Examples of the monomers having oxazoline groups include, but are not limited to, 2-vinyl-2-oxazoline (VOZO), 5-methyl-2-vinyl-2-oxazoline (MVOZO), 4,4-dimethyl-2-vinyl-2-oxazoline (DMVOZO), 4,4-dimethyl-2-vinyl-5,6-dihydro-4H-1,3-oxazine (DMVOZI), 4,4,6-trimethyl-2-vinyl-5,6-dihydro-4H-1,3-oxazine (TMVOZI), 2-isopropenyl-2-oxazoline (IPOZO), 4,4-dimethyl-2-isopropenyl-2-oxazoline (DMIPOZO), 4-acryloyl-oxymethyl-2,4-dimethyl-2-oxazoline (AOZO), 4-methacryloyl-oxymethyl-2,4-dimethyl-2-oxazoline (MAOZO), 4-methacryloyl-oxymethyl-2-phenyl-4-methyl-2-oxazoline (MAPOZO), 2-(4-vinylphenyl)-4,4-dimethyl-2-oxazoline (VPMOZO), 4-ethyl-4-hydroxymethyl-2-isopropenyl-2-oxazoline (EHMIPOZO), and 4-ethyl-4-carboethoxymethyl-2-isopropenyl-2-oxazoline (EEMIPOZO).

Vinyloxazolines easily undergo radical polymerization in the presence of AIBN or BPO to produce a polymer having oxazoline rings in the side chain. Vinyloxazolines also produce similar poly(vinyloxazolines) through anionic polymerization using n-butyl lithium as catalyst. There are the methods not resorting to the use of the monomers having oxazoline rings, for example, a method comprising isomerization reaction of poly(methacryloylazilidine), for the synthesis of poly(vinyloxazolines).

Polymer (A) containing oxazoline groups used in the present invention may be copolymerized with other optional copolymerizable monomers, preferably (meth)acrylonitrile and styrene. Monomers other than the above-mentioned may also be copolymerized. In either case, it is preferable that an oxazoline-containing monomer, (meth)acrylonitrile and styrene are copolymerized as three primary monomeric components of polymer (A). The expression "three primary monomeric components" used here means "three components with the highest to the 3rd highest content" in the monomers composing the oxazoline-containing copolymer, which signifies the probable presence of other monomer(s) than these three primary components. It is also preferable that the oxazoline group density is high, and that the oxazoline equivalent is not more than 300 g/eq.

The above-mentioned "preferred conditions" relating to polymer (A) are the conditions for further improving dissolving and dispersing stability of polymer (A) as a coating material, transparency of the coat, blocking resistance and adhesion to overcoating.

It is also preferable that the polymers (A) are dispersible and soluble in water, especially that they are soluble in water. They may be made dispersible and/or soluble in water by using an organic solvent mixable with water. In this case, a coating film with excellent transparency and anti-block properties is formed even when stretching is conducted after coating.

The coating layer in the present invention may contain the compounds other than the said polymer (A) having oxazoline groups. Examples of the components other than the polymer (A) include binder, crosslinking agent, organic particles, inorganic particles, wax, surfactant, defoaming agent, coating properties improver, thickener, antioxidant, ultraviolet absorber, foaming agent, dye and pigment.

The amount of polymer (A) in dry solid matter of the coating solution is not specifically defined in the present invention, but preferably polymer (A) is 0.1 to 100% by weight, more preferably 1 to 50% by weight, especially preferably 3 to 30% by weight of dry solid matter of the coating solution. If the amount of polymer (A) is less than 0.1%, satisfactory adhesion may not be obtained. Also, too much amount of polymer (A) in comparison with the resin used therewith serves for elevating stickiness or blocking tendency. This is considered attributable to the increase of oxazoline groups which were left unreacted with the functional group of the resin.

Various kinds of polymers can be used as the resin to be contained in the coating layer, but polyesters, polymer(s) of vinyl monomer, polyurethanes and polyvinylidene chloride are preferred in view of adhesion promotion.

As the components of the polyester used as a binder for the coating layer in the present invention, there can be exemplified the polyvalent carboxylic acids and polyvalent hydroxyl compounds such as listed below. Examples of the polyvalent carboxylic acids include terephthalic acid, isophthalic acid, orthophthalic acid, phthalic acid, 4,4'-diphenylcarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebasic acid, dodecanedicarboxylic acid, glutaric acid, succinic acid, trimellitic acid, trimesic acid, trimellitic acid anhydride, phthalic anhydride, p-hydroxybenzoic acid, trimellitic acid monopotassium salt, and ester-forming derivatives thereof. Examples of the polyvalent hydroxyl compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate. The polyesters can be synthesized by the ordinary polycondensation reaction.

Besides the above-mentioned, the composite polymers having such polyester components as so-called acrylic graft polyesters such as disclosed in Japanese Patent Application Laid-Open (KOKAI) No. 1-165633 and polyester polyurethanes produced by chain-lengthening polyester polyols with an isocyanate are also included in the polyesters usable for coating composition binder in the present invention.

The polyester for coating composition binder used in the present invention is preferably the one which is capable of forming a coating composition using water as medium. The polyester may be of the type which is capable of forming a coating composition after forced dispersion by a surfactant or the like, but it is preferably a self-dispersing type polyester having hydrophilic nonionic components such as polyethers or cationic groups such as quaternary ammonium salts, more preferably a water-soluble or water-dispersible polyester resin having anionic groups. The "polyester having anionic groups" is a polyester to which a compound having anionic groups has been attached by means of copolymerization or grafting. The compound is properly selected from sulfonic acid, carboxylic acid, phosphoric acid and their lithium salt, sodium salt, potassium salt and ammonium salt.

The amount of the anionic groups in the polyester is preferably in the range of 0.05 to 8% by weight. When the amount of the anionic groups is less than 0.05% by weight, the produced polyester resin tends to deteriorate in water solubility or water dispersibility, while when the amount of the anionic groups exceeds 8% by weight, water resistance of the coating layer may deteriorate, or the obtained films may become liable to stick to each other (blocking) after moisture absorption.

The polymer of vinyl monomer used for the coating layer in the present invention are the polymers comprising the polymerizable monomers having carbon-carbon double bonds, specifically acrylic or methacrylic monomers. These polymers may be either homopolymers or copolymers. Copolymers of these and other polymers (such as polyesters and polyurethanes), which may be block or graft copolymers, are also included in the concept of said polymers in the present invention. They also include the polymers (polymer mixtures in some cases) obtained by polymerizing the polymerizable monomers having carbon-carbon double bonds in a polyester solution or a polyester dispersion; the polymers (polymer mixtures in some cases) obtained by polymerizing the polymerizable monomers having carbon-carbon double bonds in a polyurethane solution or a polyurethane dispersion; and the polymers (polymer mixtures in some cases) obtained by polymerizing the polymerizable monomers having carbon-carbon double bonds in other polymer solution or dispersion.

The polymerizable monomers having carbon-carbon double bonds usable in the present invention are not specified, but they include as typical examples thereof the following: monomers having various types of carboxyl groups, such as acrylic acid, methacrylic acid, crotonic acid, itaconic acid, fumaric acid, maleic acid, citraconic acid and their salts; monomers having various types of hydroxyl groups, such as 2-hydroxyethyl (meth)acrylate, 2-hydroxypropyl (meth)acrylate, 4-hydroxybutyl (meth) acrylate, monobutylhydroxyl fumalate and monobutylhydroxyl itaconate; various (meth)acrylic esters such as methyl (meth)acrylate, ethyl (meth)acrylate, propyl (meth)acrylate, butyl (meth)acrylate and lauryl (meth)acrylate; various types of nitrogen-containing vinyl monomers such as (meth) acrylamides, diacetone acrylamides, N-methylol acrylamides and (meth)acrylonitrile; styrene and various styrene derivatives such as α-methylstyrene, divinylbenzene and vinyltoluene, and various vinyl esters such as vinyl acetate and vinyl propionate; various silicon-containing polymerizable monomers such as γ-methacryloxypropyltrimethoxysilane, vinyltrimethoxysilane and Silaplane FM-07 (a methacryloyl silicon macro-monomer produced by Chisso Corp.); phosphorus-containing vinyl monomers; various types of halogenated vinyls such as vinyl chloride, vinylidene chloride, vinyl fluoride, trifluorochloroethylene, tetrafluoroethylene, chlorotrifluoroethylene and hexafluoropropylene; and various types of conjugated dienes such as butadiene.

The method of producing the polymers from the above-mentioned vinyl monomers is not specified in the present invention; the ordinary methods can be used for their production. For example, the polymers can be obtained by mixing the monomers such as mentioned above and a polymerization initiator with an organic solvent, and heating the mixture with stirring, or by adding dropwise the monomers and a polymerization initiator to an organic solvent while heating with stirring. Also, an organic solvent, the monomers and a polymerization initiator may be polymerized in an autoclave under high pressure. It is further possible to use emulsion polymerization or suspension polymerization using water instead of an organic solvent and if necessary additionally using a surfactant.

As the polyurethane used for the coating layer in the present invention, it is possible to use the known polyurethanes such as disclosed in Japanese Patent Publication (KOKOKU) Nos. 42-24194, 46-7720, 46-10193 and 49-37839, and Japanese Patent Application Laid-Open (KOKAI) Nos. 50-123197, 53-126058 and 54-138098, and their derivatives. These polyurethanes can be produced by reacting polyisocyanates, polyols and if necessary a chain-lengthening agent and/or a crosslinking agent.

Examples of the polyisocyanates usable for the reaction include tolylene diisocyanate, phenylene diisocyanate, 4,4'-diphenylmethane diisocyanate, hexamethylene diisocyanate, xylylene diisocyanate, 4,4,'-dicyclohexylmethane diisocyanate and isophorone diisocyanate.

As polyols, it is possible to use polyetherpolyols such as polyoxyethylene glycol, polyoxypropylene glycol and polyoxytetramethylene glycol; polyesterpolyols such as polyethylene adipate, polyethylene-butylene adipate and polycaprolactone; acrylic polyols, and castor oil. Usually, polyols having a molecular weight of 300 to 2,000 are used.

As the chain-lengthening agent or crosslinking agent, there can be used, for instance, ethylene glycol, propylene glycol, butanediol, diethylene glycol, trimethylolpropane, hydrazine, ethylenediamine, diethylenetriamine, 4,4'-diaminodiphenylmethane, 4,4,'-diaminodicyclohexylmethane, and water.

The said polyurethanes preferably have an anionic substituent, for example, —$SO_3H$ group, —$OSO_3H$ group, —COOH group and their ammonium salts, alkaline metal salts and alkaline earth metal salts, for bettering solubility in the solvents using water as main medium. The following methods (1) to (3) can be cited as means for preparing these polyurethanes, but the present invention is not limited to these embodiments.

(1) A method using the compounds having an anionic substituent as the polyisocyanate, polyol and chain-lengthening agent.

For instance, a polyisocyanate having an anionic substituent can be obtained by sulfonating an aromatic isocyanate compound. It is also possible to use an isocyanate compound having a sulfuric ester salt or diaminocarboxylic acid salt of an amino-alcohol.

(2) A method comprising reacting a compound having an anionic substituent with the unreacted isocyanate group of the produced polyurethane.

As the compound having an anionic substituent, there can be used the compounds having, for example, a bisulfite, aminosulfonic acid or its salts, aminocarboxylic acid or its salts, sulfuric ester of an amino-alcohol or its salts, or hydroxyacetic acid or its salts as the anionic substituent.

(3) A method comprising reacting an active hydrogen-containing group (OH, COOH, etc.) of the polyurethane with a specific compound.

As the specific compound, there can be used, for example, dicarboxylic acid anhydrides, tetracarboxylic acid anhydrides, sultone, lactone, epoxycarboxylic acid, epoxysulfonic acid, 2,4-dioxo-oxazolidine, isatonic acid anhydrides, and phostone. It is also possible to use the 3- to 7-membered ring cyclic compounds having a salt type group or a group capable of forming a salt after ring opening, such as carbyl sulfate. "Polyvinylidene chloride" contained in the coating layer in the present invention is a polymer obtained from emulsion polymerization of a monomeric mixture mainly comprising vinylidene chloride. Various types of (meth)acrylates are cited as examples of the monomers to be copolymerized. The ratio of vinylidene chloride in the monomeric mixture to be copolymerized is preferably not less than 50% by mole. In the present invention, by use of vinylidene chloride, the adhesion to aqueous overcoating is remarkable improved. When the ratio of vinylidene chloride is less than 50% by mole, adhesion may be unsatisfactory.

"Polyester/polymer of vinyl monomer composite" contained in the coating layer in the present invention is a generic term of various types of copolymers, i.e. random, graft and block copolymers, comprising polyester units and polymer units of vinyl monomer. They include the reaction products of polymers selected optionally from the said various types of copolymers. Such a composite can be produced, for example, by a method comprising radical polymerization of a vinyl monomer in an aqueous solution or dispersion of a polyester. In this case, hydrogen atoms of the polyester may be plucked out by the radical, causing the polymer of vinyl monomer to be graft polymerized to the side chain of the polyester. In this method, however, it is not that the monomer is always graft polymerized 100%. On the other hand, when an unsaturated polyester and a vinyl monomer are copolymerized, there can be obtained a polymer in which the polyester is graft polymerized to the polymer of vinyl monomer at high probability.

"Polyurethane/polymer of vinyl monomer composite" contained in the coating layer in the present invention is a generic term of various types of copolymers, i.e. random, graft and block copolymers, comprising polyurethane units and polymer units of vinyl monomer. They include the reaction products of polymers selected optionally from the said various types of copolymers. Such a composite can be produced, for example, by a method comprising radical polymerization of vinyl monomer in an aqueous solution or dispersion of a polyurethane. In this case, hydrogen atoms of the polyurethane may be plucked out by the radical, causing the polymer of vinyl monomer to be graft polymerized to the side chain of the polyurethane. In this method, however, it is not that the monomer is always graft polymerized 100%. On the other hand, when a polyurethane having unsaturated bonds and a vinyl monomer are copolymerized, there can be obtained a polymer in which the polyurethane is graft polymerized to the poly(meth)acrylate at high probability. When a polyurethane synthesized from a vinyl monomer having isocyanate linkage is copolymerized with a vinyl monomer, there can be obtained a copolymer in which the polyurethane and the polymer of vinyl monomer have undergone complicated crosslinking reaction.

The coating layer in the present invention may contain a compound or compounds other than polymer (A) and the above-mentioned resins, for example, other types of resin, crosslinking agent, organic particles, inorganic particles, wax, surfactant, defoaming agent, coating properties improver, thickener, antioxidant, ultraviolet absorber, foaming agent, dye and pigment. The amount of the compound(s) other than polymer (A) in the coating layer is not specifically defined, but it is usually not more than 99% by weight, preferably 0 to 95% by weight, more preferably 0 to 90% by weight.

The coating composition used in the present invention is preferably the one using water as medium for reasons of hygienic safety, but the composition may contain an organic solvent provided that it does not overstep the concept of the present invention, and that the compound containing such a solvent can be dissolved in water.

The solids concentration of the coating composition used in the present invention is not specifically defined, but it is preferably in the range of 0.4 to 65% by weight, more preferably 1 to 30% by weight, most preferably 2 to 20% by weight.

As means for applying the said coating solution on a polyester film, it is possible to use the various coating devices such as illustrated in Yuji Harasaki: Handbook of Coating Devices and Their Operational Techniques, Sogo Gijutsu Center, 1990, which include forward roll coater, reverse roll coater, gravure coater, knife coater, blade coater, rod coater, air doctor coater, curtain coater, fountain coater, kiss-coater, kiss-roll coater, bead coater, dip coater, screen coater, cast coater, spray coater, and other types of coaters and coating systems such as impregnator and LB coating system.

The pre-coated film may be subjected to a chemical treatment or discharge treatment for improving the coating properties and adhesion of the coating layer to the film. Also, a discharge treatment may be applied on the coating layer after its formation for improving the coating properties and adhesion of the coating layer to the biaxially stretched polyester film of the present invention.

The thickness of the coating layer, determined as that of the dry solids in the final product, preferably falls in the range of 0.005 to 10.0 $\mu$m, more preferably 0.01 to 2.0 $\mu$m, especially preferably 0.015 to 0.2 $\mu$m. The thickness of coating layer is preferably made as small as it can be within the above range. When the thickness of coating layer exceeds 10.0 $\mu$m, there may arise problems of blocking, etc., become conspicuous. On the other hand, when the thickness of coating layer is less than 0.005 $\mu$m, it may become unable to obtain the preferred performance of the film, and also there tends to take place coating defects or uncoated spots.

The coating step may be conducted at various stages in the polyester film producing process. For example, coating may be performed on the non-stretched film, the coated film being then stretched mono- or biaxially. Or coating may be conducted on the monoaxially stretched film, and this coated monoaxially stretched film may be offered as a product or may be further stretched to provide a coated biaxially stretched film. The features of the present invention are displayed to the maximum when coating is conducted in the polyester film producing process and the coated film is then stretched. It is especially preferable to carry out coating before tentering as this makes it possible to minimize or unnecessitate enlargement of the drying oven. In a typical embodiment of the process of the present invention, the said aqueous coating composition is applied on a film which has been stretched in the machine (longitudinal) direction, and this coated film is dried, stretched transversely, heat set and taken up. If necessary, the thus treated film may be re-stretched in the longitudinal direction and relaxed. Drying of the coating layer is preferably conducted during preheating before transverse stretching of the polyester film or in the course of transverse stretching. In the similar embodiments of the present invention, coating is conducted on the non-stretched film and this coated film is monoaxially stretched or biaxially stretched simultaneously by a tenter.

The coating layer in the present invention may be of a single-layer or multi-layer structure, or it may be provided as a single layer or plural layers in a multi-layer structure.

A typical film producing process according to the present invention will be described in further detail.

The starting polyester material is supplied to an extruder, melted at a temperature above the melting point of the polyester and extruded as a molten sheet from a slit die. The molten sheet is rapidly cooled to a temperature below the glass transition point and solidified on a rotary cooling drum to obtain a non-stretched sheet of a substantially amorphous state. In this operation, it is preferable to elevate adhesion between the sheet and the rotary cooling drum for improving flatness of the sheet, and for this purpose, an electrostatic pinning method and/or liquid coat adhering method are preferably used in the present invention.

The thus obtained non-stretched coated sheet is first stretched in the machine direction. This stretching is preferably conducted at a temperature in the range of 70 to 150° C. for a stretch ratio of 2.5 to 6 times. Stretching may be conducted in a single step or in two or more steps. In the present invention, the said coating solution is applied on at least one side of the sheet and then dried at an arbitrary stage in the process. Most preferably, this operation is conducted at a stage after longitudinal stretching and before transverse stretching. Then the resulting monoaxially oriented film is once cooled to a temperature below the glass transition point or not cooled but preheated to a temperature range of, for example, 90 to 150° C., and further stretched 2.5 to 5 times, preferably 3.0 to 4.5 times transversely, namely in the direction orthogonal to the direction of longitudinal stretching, to obtain a biaxially oriented film. If necessary, preheating may be reinforced. The thus obtained film is heat treated for a period of one second to 5 minutes with an elongation of not more than 30% or under a limited shrinkage or constant length. In this process, in order to attain an optimal degree of heat shrinkage in the longitudinal direction, it is possible to incorporate an appropriate technique, such as relaxing the film by an amount of not more than 10%, preferably not more than 5%, in the longitudinal direction in the step of heat treatment or after the heat treatment. The heat treatment temperature, though variable depending on the stretching conditions, is preferably in the range of 180 to 250° C., more preferably 200 to 230° C. When the heat treating temperature exceeds 250° C., the film density becomes too high. Also, part of the coating layer may be thermally decomposed. On the other hand, when the heat treating temperature is below 180° C., there results a too high rate of heat shrinkage of the film.

In the manufacture of the coated films according to the process of the present invention, defectives are produced at a certain rate. So, recycling of such defective products is of great industrial interest. If no reclaimed material is mixed in the starting polyester, the production cost elevates, but too much mixing of the reclaimed material causes tinting in the melt extrusion or other steps. It also impairs the dynamic properties of the produced polyester film. The reclaimed material is preferably mixed into the material for the base polyester film. Though variable depending on the polyester film thickness, coating layer thickness, polymer (A) content, production yield and other factors, the reclaimed material is preferably mixed in the base polyester film in such a manner that a percentage of the polymer (A) or reaction product of polymer (A) is not more than 10% by weight based on the weight of the material for the base polyester film. Mixing of the amount of the coating layer in the reclaimed material in excess of 10% by weight may cause deterioration of the optical and dynamic properties such as mentioned above of the produced film.

The ink jet image receiving layer used for overcoating is an aqueous solution comprising a binder, fine particles and a crosslinking agent. The solvent or dispersing medium used for the said aqueous solution contains water. However, the solvent or dispersing medium may contain an organic solvent compatible to water. The ink jet image receiving layer has an ability of absorbing an ink for ink jet immediately.

As the binder, ther are exemplified homopolymer and copolymer of vinyl monomer(s), cellulose derivatives, dextrin and dextrin derivatives, and gelatin and gelatin derivatives.

Examples of homopolymer and copolymer of vinyl monomer(s) are polymer whose consttitution component contains vinyl monomer unit and (meth)acrylic monomer unit. Specifically, sodium polyacrylate, polyacrylamide, polystyrene, polymer of maleic anhydride, homo- or co-polyvinylacetate. Of these, polyvinylalcohol, polyvinylpyrrolidone and polyvinylacetal are preferred.

The "polyvinyl alcohols" described herein are contemplated to generally involve various derivatives thereof. For instance, it is not essential that the saponification percentage of the polyvinyl alcohols is 100%, namely those having a saponification percentage other than 100% may also be used in the present invention. In addition, the polyvinyl alcohols may include those compounds into which various functional groups such as carboxyl group, sulfonic group and acetoacetyl group are introduced.

The "polyvinyl pyrolidones" described above are also contemplated to generally involve various copolymers thereof, for example, copolymers of vinyl pyrolidone and vinyl acetate.

The "polyvinyl acetals" described above are also contemplated to generally involve acetalized polymers obtained by condensing a large part of hydroxyl groups of the polyvinyl alcohol with aldehyde. Among these polyvinyl acetals, polyvinyl butyral obtained from butyraldehyde is more suitably applied to ink-jet printing.

As the cellulose derivatives, there may be exemplified methyl cellulose, carboxymethyl cellulose, hydroxyethyl cellulose, hydroxypropyl cellulose, hydroxypropylmethyl cellulose, diethylaminoethyl cellulose, diethyl ammonium chloride hydroxyethyl cellulose, hydroxypropyltrimethyl ammonium chloride hydroxyethyl cellulose, cellulose sulfate or the like.

As the starch derivatives, there may be exemplified modified starches such as cationic starches, ether starches and ester starches.

As the gelatin derivatives, there may be exemplified acid-treated gelatins, alkali-treated gelatins or the like.

Examples of binder materials other than the above mentioned materials are gum arabic, gum tragacanth, karaya gum, locust bean gum, tara gum, guar gum, tamarind gum, chitosan, sodium alginate, propylene alginate glycol ester, carrageenan, agar, pectin, xanthane gum, pullulan, dextran, casein, hyaluronic acid, chondroitin sulfuric acid, polyethyleneglycol, polydioxolan, polyethylene imine and block copolymer of ethylene oxide and propylene oxide.

The fine particles contained in the ink-jet image-receiving layer may include various organic or inorganic particles. For example, there may be used cross-linked organic particles such as cross-linked polystyrene particles, cross-linked methyl methacrylate particles, benzoguanamine resin particles, phenol resin particles, melamine resin particles, epoxy resin particles or the like. Examples of the inorganic particles include particles of silica, alumina, titanium oxide, zinc oxide, calcium carbonate or natural minerals.

As the cross-linking agents contained in the ink-jet image-receiving layer, there may be exemplified amino resins (including melamine resins, etc.), aziridine compounds, epoxy compounds, oxazoline compounds, isocyanate compounds, carbodiimide compounds, various coupling agents or the like.

The coating solution may further contain waxes, surfactants, anti-foaming agents, coatability-improving agents, thickeners, antioxidants, UV absorbers, foaming agents, dyes, pigments or the like.

As the water-based paints used in the present invention for finish coating, there may be used not only transparent paints but also colored ones such as water-based inks. Examples of the water-based inks include aqueous UV-curable inks, aqueous gravure inks, aqueous screen-printing inks or the like. These water-based paints may contain, in addition to dyes or pigments, a compound, as binder, selected from the group consisting of (meth)acrylate derivatives, poly(meth) acrylate, polyesters, polyurethanes and polyamides. Further, the water-based paints may contain a cross-linking agent such as aziridine compound, metal chelate compound, isocyanate compound, epoxy compound, melamine compound, carbodiimide compound, oxazoline compound or the like.

The present invention is directed to a stretched polyester film having a novel coating layer which is excellent in transparency, gloss, adhesion to an ink-jet image-receiving layer, and anti-sticking property. Accordingly, the coating layer of the present invention can be suitably used in applications requiring a transparency. However, the coating layer of the present invention can also be suitably applied to translucent and opaque films. In general, it might be considered that a translucent or opaque film requires no transparent coating layer. This is not always correct. The transparency of coating layer has a close relation to gloss thereof, i.e., turbid coating layer has a low gloss. If a good adhesion property can be imparted to the base film without adversely affecting its gloss, the gloss of finally produced film will be readily controlled. Therefore, it is useful to all polyester films to provide a coating layer fulfilling these requirements.

Thus, the polyester film of the present invention has a novel coating layer which is excellent in transparency, adhesion to an ink-jet image-receiving layer and anti-sticking property and, therefore, is industrially advantageous.

EXAMPLES

The present invention will be described in further details by showing the examples thereof, which examples, however, are merely intended to be illustrative and not to be construed as limiting the scope of the invention in any way. The evaluation methods used in the examples are as described below. In the following Examples and Comparative Examples, all "parts" are by weight unless otherwise noted.

(1) Intrinsic Viscosity [η] (dl/g) of the Polymer 1 g of the polymer was dissolved in 100 ml of a phenol/tetrachloroethane (50/50 by weight) mixed solvent, and the viscosity of the solution was measured at 30° C.

(2) Blend Stability of the Coating Composition

The prepared coating composition was put into a glass bottle and left as it was for one day, after which the degree of generation or inclusion of gel and foreign matter in the coating composition was visually judged. Rating was made according to the following criterion.

A: Excellent. No foreign matter existed.
B: Good. Foreign matter existed only slightly.
C: Rather good. Foreign matter existed to some extent.
D: Poor. Foreign matter existed in a fairly large amount, or thickening of the coating composition was observed.
E: Very poor. Foreign matter existed in bulk, or the coating composition was solidified into a jellylike mass.

(3) Film Haze

Cloudiness of the film was determined according to JIS-K6714 using an Ulbricht sphere hazeometer NDH-20D (mfd. by Nippon Denshoku Kogyo KK). As a measure of transparency, the increment of haze by the coating layer should preferably be not more than 0.3%.

(4) Stickiness (Blocking Tendency)

Films were placed one over another and pressed under the conditions of 40° C., 80% RH, 10 kg/cm$^2$ and 20 hours. Usually pressed films stay sticking to each other. These films were peeled off and peel strength was measured according to ASTM-D-1893. Higher peel strength indicates stronger stickiness (blocking tendency). If the films with such strong stickiness are rolled up, blocking tends to take place, so that such films are unacceptable as an industrial product. Thus, the smaller the numerical value of stickiness, the more preferable. Even in the case of a thick film, if its stickiness is large, the film may break when it is unwound.

(5) Adhesion Property

The following water-based binder was applied to the surface of a polyester base film, dried and then cured. Thereafter, solid black was printed on the thus coated film using an ink jet printer. The adhesion between the coating layer and the polyester base film was evaluated by the following method. That is, the following water-based resins (a) to (e) were used to prepare five finish coating compositions. The respective finish coating compositions were coated on the base film, and the adhesion of each coating layer to the base film was evaluated and expressed by the number of points respectively assigned to the five ratings described below. The average of the five numbers resulting from the above evaluation was regarded as the adhesion property of the coated film.

Water-based Resin (a) Polyvinyl alcohol:
   Saponification percentage: about 88%;
   Degree of polymerization: about 1,500,
(b) Polyvinyl pyrolidone:
   Molecular weight (Mw): about 5,000,
(c) Polyvinyl acetal (polyvinyl butyral):
   Percentage of butyralization: about 8 mol %;
   Percentage of acecylation: not more than 3 mol %
   (the balance being polyvinyl alcohol units);
   Degree of polymerization: about 500,
(d) Sodium carboxymethyl cellulose:
   Amount of sodium carboxymethyl group introduced per one mole of glucose ring: about 1.2 moles;
   Degree of polymerization: about 500,
(e) Gelatin (alkali-treated gelatin):
   Viscosity of 6.7 wt % aqueous solution: about 35 mPs Cross-linking Agent
   Hexamethoxymethyl melamine, Finish Coating Composition
   The above water-based resin:the above cross-linking agent=80:20 (% by weight) (based on dry solid content), Coating Amount
   5 μm thick after drying.

Drying and Curing
   After drying at 120° C. for 3 minutes, the dried material was allowed to stand for one day, Printing and Drying
   Solid black was printed on the film by an ink jet printer. The printed solid image was allowed to stand for 30 minutes, thereby drying the printed ink.

Evaluation of Adhesion
   Adhesion property: The printed film was subjected to a peel test using an adhesive tape (CELOTAPE), thereby evaluating the degree of peeling of the ink (image-receiving layer) according to the following ratings. The evaluation was totally made using the above-described two kinds of finish coating compositions. When the results were different from each other, the poorer one was finally regarded as the adhesion property.

Evaluation Ratings 5 points: Excellent; Not peeled at all,
4 points: Better; Slightly peeled (percentage of area peeled: less than 10%)
3 points: Good; Somewhat peeled (percentage of area peeled: not less than 10% and less than 50%),
2 points: Not good; Considerably peeled (percentage of area peeled: not less than 50% and less than 100%),
1 point: Poor; A portion to which an adhesive tape was adhered, was completely peeled.

(6) Oxazoline Group Equivalent

A polymer solution containing an oxazoline group was freeze dried and analyzed by $^1$H-NMR, and the oxazoline group equivalent was calculated from the absorption peak strength attributable to the oxazoline group and the absorption peak strength attributable to other monomers.

(Preparation of Coating Compositions)

The water-based coating stock solutions as described above were blended to prepare the water-based coatings of the compositions shown in Table 2.

Comparative Example 1

Polyethylene terephthalate containing 0.005% by weight of $SiO_2$ having an intrinsic viscosity of 0.65 and a particle size (diameter) of 1.5 μm was dried by a conventional method, supplied to an extruder, melted at 290° C., extruded into the form of a sheet, and rapidly cooled on a cooling roll using an electrostatic pinning method to obtain an amorphous sheet. The thus obtained non-stretched sheet was roll stretched 2.5 times at 85° C., followed by 1.3 times stretching at 95° C., in the machine direction. The resulting monoaxially stretched film was led to a tenter, whereby the film was stretched 4.0 times in the transverse direction at 120° C. and heat treated at 235° C. to obtain a biaxially stretched polyester film with the base polyester film thickness of 50 μm. The obtained film was a flat film having high transparency but defective in adhesion. Transparency and adhesion of the obtained film are shown in Table 3.

Example 1

A monoaxially stretched film was obtained in the same way as in Comparative Example 1. On one side of this film was applied a coating of the composition shown as Example 1 in Table 2. The component materials (symbolized by the letters of the alphabet) of the coatings shown in Table 2 are explained in Table 1. Then, in the same way as in Comparative Example 1, the film was led into a tenter whereby the film was dried, stretched transversely and heat treated to obtain a biaxially stretched film. As the coat was also stretched, the final coating thickness after drying was 0.05 μm. Properties of the thus obtained film are shown in Table 3. The film had excellent transparency and adhesion and was small in stickiness or blocking tendency.

Examples 2 and 3

Biaxially stretched films of Examples 2 and 3 were obtained in the same way as in Example 1. That is, monoaxially stretched films were obtained according to the method of Example 1, and on one side of these films were applied the coatings of the compositions shown as Example 2 and 3, respectively, in Table 2. The component materials of the coatings shown in Table 2 are explained in Table 1. Then, in the same way as Example 1, these films were led into a tenter by which they were dried, stretched transversely and heat treated to obtain biaxially stretched films. As the coat was also stretched, the final coating thickness after drying was 0.05 μm in both films. Properties of these films are shown in Table 3. They had excellent adhesion and were relatively small in stickiness. Comparing Examples 1 to 3, in all of which a same amount of oxazoline polymer was used, it is noted that Example 1 is the best, followed by Examples 2 and 3 in that order. That is, Example 2 was slightly inferior to Example 1 in transparency and adhesion, and was also rather large in stickiness. In Example 3, microcracks developed in the coat surface to enlarge haze of the film. Small stickiness of this film is supposed due to surface unevenness created by microcracks.

Comparative Examples 2 and 3

Biaxially stretched films of Comparative Examples 2 and 3 were obtained in the same way as in Examples 2 and 3. That is, monoaxially stretched films were obtained according to the method of Example 1, and on one side of these films were applied the coatings of the compositions shown as Comparative Example 2 and 3, respectively, in Table 2. Component materials of the coatings shown in Table 2 are explained in Table 1. Then, in the same way as Example 1, these films were led into a tenter whereby they were dried, stretched transversely and heat treated to obtain biaxially stretched films. As the coat was also stretched, the final coating thickness after drying was 0.05 μm. Properties of the obtained films are shown in Table 3. Comparison of Comparative Examples 2 and 3 with Examples 1 to 3 indicates that oxazoline-based coating excels in adhesion.

Examples 4 to 13

Biaxially stretched films of Examples 4 to 13 were obtained in the same way as in Example 1. That is, monoaxially stretched films were obtained by the method of Example 1, and on one side of these films were applied the coatings of the compositions shown as Examples 4 to 13, respectively, in Table 2. Component materials of the coatings shown in Table 2 are described in Table 1. Then, in the same way as Example 1, these films were respectively led into a tenter by which they were dried, stretched transversely and heat treated to obtain biaxially stretched films. The coat was also stretched, so that the final coating thickness after drying was 0.05 μm in each film. Properties of the obtained films are shown in Table 3.

Each film had excellent transparency and adhesion and was small in stickiness. Especially, Examples 4 to 12 showed outstanding adhesion. In Examples 11 and 12 in which a polyester/poly(meth)acrylate composite and a polyurethane/poly(meth)acrylate composite were used respectively, stickiness (blocking tendency) was smaller than Examples 5 and 8.

Comparative Example 4

Polyethylene-2,6-naphthalate (PEN) containing 0.005% by weight of $SiO_2$ having a particle size of 1.5 μm and an intrinsic viscosity of 0.68 was dried in the usual way, supplied into an extruder, melted at 300° C., extruded into a sheet and rapidly cooled on a cooling drum using electrostatic pinning technique to obtain an amorphous sheet. This non-stretched film was stretched 3.5 times in the machine direction by roll stretching at 135° C. The monoaxially stretched film was then led into a tenter whereby the film was stretched 4.0 times in the transverse direction at 135° C. and then heat treated at 23° C. to obtain a biaxially stretched polyester film with a base polyester film thickness of 50 μm. The thus obtained film was a flat film with very excellent transparency, but it lacked adhesion. The results of evaluation of transparency and adhesion of this film are shown in Table 3.

Example 14

A coating of the composition shown as Example 1 in Table 2 was applied on the polyethylene-2,6-naphthalate film of Comparative Example 4 to obtain an in-line coated film of Example 14. Component materials of the coating shown in Table 2 are explained in Table 1. Properties of the obtained film are shown in Table 3. This film was excellent in transparency, adhesion and anti-block properties.

Examples 1' to 14'

The polyester films obtained in Examples 1 to 14 were crushed into pellets, and these pellets (hereinafter called "regenerated polyester") were added, in an amount of 20% by weight, to polyethylene terephthalate of the respective Examples. That is, in Example 1', regenerated polyester of Example 1 was added in an amount of 20% by weight, and in Example 2', regenerated polyester of Example 2 was added in an amount of 20% by weight, with this pattern of addition of regenerated polyester being repeated in the succeeding Examples 3' to 14', and in-line coating was conducted on the respective regenerated polyester-incorporated polyester films to obtain biaxially stretched polyester films. Properties of the obtained films were the same as those shown in Table 3. However, each of these films assumed a slight yellowish tinge although no difference was noted in haze. This tendency became slightly stronger when a polyurethane-based polymer was applied for coating. There was seen remarkable coloring and generation of cracked gas when a vinylidene chloride-based polymer was used (Example 10'). This indicates impracticability of utilization of regenerated polyester in Example 10'.

TABLE 1

| Symbol | Contents (polymer (A) having oxazoline groups) |
|---|---|
| A1 | Monomer composition: isopropenyl-2-oxazoline/acrylonitrile/styrene = 50.5/19.5/30 (wt %) Offered as a water/propylene glycol monomethyl ether mixed solution of the polymer obtained from copolymerization of the above monomer composition. This mixed solution is miscible with water in all proportions to form a homogeneous solution. Oxazoline equivalent = 220 g (solids)/eq. |
| A2 | Monomer composition: 2-isopropenyl-2-oxazoline/acrylonitrile = 50.5/49.5 (wt %) Offered as a water/propylene glycol monomethyl ether mixed solution of the polymer produced from copolymerization of the above monomer composition. This mixed solution is miscible with water in all proportions to form a homogeneous solution. Oxazoline equivalent = 220 g (solids)/eq. |
| A3 | Monomer composition: 2-isopropenyl-2-oxazoline/acrylonitrile/styrene/butyl acrylate = 20/38/42 (wt %) Offered as a water dispersion of the polymer produced from copolymerization of the above monomer composition. Emulsifier: polyoxyethylene nonylphenyl ether ammonium sulfate (3 wt % of the total amount of monomers) Oxazoline equivalent = 555 g (solids)/eq. |
| A4 | Methoxymethylmelamine (hexa-type) |
| A5 | Polyglycerol polyglycidyl ether |

| Symbol | Contents |

TABLE 1-continued

| B1 | Polyester-based binder. Monomer composition: (acid moiety) isophthalic acid/3a,4,5,7a-tetrahydro-7-methyl-5-(tetrahydro-2,5-dioxo-3-furanyl)-1,3-isobenzofuranedione//(polyol moiety) neopentyl glycol/diethylene glycol = 98/2//88/12 (mol %) Offered as an aqueous solution of the polymer produced from copolymerization of the above monomer composition. Dissolving in water was conducted by adding ammonia to make the solution weakly alkaline and heating the solution. |
|---|---|
| B2 | Polyester-based binder. Monomer composition: (acid moiety) terephthalic acid/5-sodiumsulfoisophthalic acid//(diol moiety) ethylene glycol/diethylene glycol = 92/81//77/23 (mol %) Offered as a water dispersion of the polymer produced from copolymerization of the above monomer composition. |
| B3 | Polyacrylate-based binder Monomer composition: methyl methacrylate/ethyl acrylate/acrylonitrile/N-methylolacrylamide/methacrylic acid = 41/46/7/51 (mol %) Offered as a water dispersion of the polymer produced from copolymerization of the above monomer composition. Emulsifier: polyoxyethylene nonylphenyl ether ammonium sulfate (5 wt % of the total amount of monomers) |
| B4 | Polyacrylate-based binder Monomer composition: methacrylic acid/butyl acrylate/methyl methacrylate/2-hydroxyethyl methacrylate = 15/35/35/15 (mol %) Offered as an aqueous solution after solution polymerization in an organic solvent and solvent substitution. |
| B5 | Polyurethane-based binder Offered as a water dispersion of polyurethane produced by reacting 94 parts by weight of polyester of the following monomeric composition, 6 parts by weight of 2,2-dimethylolpropionic acid and 11 parts by weight of isophorone diisocyanate. Neutralized with triethylamine and dispersed in water. Monomeric composition of polyester: (acid moiety) terephthalic acid/isophthalic acid//(diol moiety) ethylene glycol/diethylene glycol = 60/40//61/39 (mol %) |
| B6 | Polyurethane-based binder Offered as a water dispersion of polyurethane produced by reacting 94 parts of polyester of the following monomeric composition, 6 parts of following monomeric composition, 6 parts of dimethylolpropionic acid and 10 parts of 2,4-dicyclohexylmethane diisocyanate. Neutralized with triethylamine while adding N-methylpyrrolidone and dispersed in water. Monomeric composition of polyester: (acid moiety) adipic acid//(diol moiety) hexanediol/neopentyl glycol = 100//60/40 (mol %) |
| B7 | Vinylidene chloride polymer Monomer composition: vinylidene chloride/methyl methacrylate = 75/15 (wt %) Offered as a water dispersion to polymer produced from copolymerization of the above monomer composition. Emulsifier: polyoxyethylene nonylphenyl ether sodium sulfate (2 wt % of the total amount of monomers) |
| B8 | Polyester and poly(meth)acrylate composite Obtained from radical polymerization of methyl methacrylate (MMA) in an aqueous solution of polymer B1. B1 (solids)/MMA (feed) = 50/50 (wt %). Mixture of B1, polymethyl methacrylate and graft copolymer of the two. Offered as a water dispersion of the above composition. Emulsifier: polyoxyethyleneoleyl ether phosphate (1 wt % of the total amount of monomers). |
| B9 | Polyurethane and poly(meth)acrylate composite Obtained from radical polymerization of methyl composite obtained by radical polymerizing |

TABLE 1-continued methacrylate (MMA) in an aqueous solution of polymer B5. B5 (solids)/MMA (feed) = 50/50 (wt %).
Mixture of B5, polymethyl methacrylate and graft copolymer of the two.
Offered as a water dispersion of the above composition.
Emulsifier: polyoxyethyleneoleyl ether phosphate (1 wt % of the total amount of monomers).

B10 Polyolefin-based binder
Chemipearl S-120 produced by Mitsui Du Pont Chemical Co., Ltd. (water dispersion of an ionomer).

C1 Silicon oxide
Offered as a water dispersion (colloidal silica) with particle size of 0.07 µm.

TABLE 2

| No. | Solids compositions of coatings |
|---|---|
| S1  | B4 / A1 / C1 = 85 / 10 / 5 |
| S2  | B4 / A2 / C1 = 85 / 10 / 5 |
| S3  | B4 / A3 / C1 = 85 / 10 / 5 |
| S4  | B4 / A4 / C1 = 85 / 10 / 5 |
| S5  | B4 / A5 / C1 = 85 / 10 / 5 |
| S6  | A1 / C1 = 95 / 5 |
| S7  | B1 / A1 / C1 = 85 / 10 / 5 |
| S8  | B2 / A1 / C1 = 85 / 10 / 5 |
| S9  | B3 / A1 / C1 = 85 / 10 / 5 |
| S10 | B5 / A1 / C1 = 85 / 10 / 5 |
| S11 | B6 / A1 / C1 = 85 / 10 / 5 |
| S12 | B7 / A1 / C1 = 85 / 10 / 5 |
| S13 | B8 / A1 / C1 = 85 / 10 / 5 |
| S14 | B9 / A1 / C1 = 85 / 10 / 5 |
| S15 | B10 / A1 / C1 = 85 / 10 / 5 |

TABLE 3

| | Coating layer | | | Film properties | | |
|---|---|---|---|---|---|---|
| | Composition | Thickness (µm) | Compounding stability | Haze (%) | Stickiness (g) | Adhesiveness |
| Comp. Example 1 | (None) | | | 0.7 | 8 | E |
| Comp. Example 2 | S4 | 0.05 | A | 0.8 | 28 | E |
| Comp. Example 3 | S5 | 0.05 | A | 0.8 | 76 | E |
| Comp. Example 4 | (None) | | | 0.7 | 8 | E |
| Example 1 | S1 | 0.05 | A | 0.7 | 30 | B |
| Example 2 | S2 | 0.05 | A | 0.9 | 40 | C |
| Example 3 | S3 | 0.05 | A | 2.5 | 36 | D |
| Example 4 | S6 | 0.05 | A | 0.7 | 35 | A |
| Example 5 | S7 | 0.05 | A | 0.7 | 26 | A |
| Example 6 | S8 | 0.05 | A | 0.9 | 18 | C |
| Example 7 | S9 | 0.05 | A | 0.7 | 25 | C |
| Example 8 | S10 | 0.05 | A | 0.8 | 20 | C |
| Example 9 | S11 | 0.05 | A | 0.7 | 28 | A |
| Example 10 | S12 | 0.05 | A | 1.1 | 34 | A |
| Example 11 | S13 | 0.05 | A | 0.7 | 17 | B |
| Example 12 | S14 | 0.05 | A | 0.7 | 18 | C |
| Example 13 | S15 | 0.05 | A | 0.9 | 23 | D |
| Example 14 | S1 | 0.05 | A | 0.7 | 30 | B |

Note:
Comparative Example 4 and Example 14: PEN
Example 10: Regeneration was impractical

What is claimed is:

1. A coated film comprising:
   a polyester film,
   a coating layer on said polyester film formed by applying a coating solution containing a copolymer of a monomer having oxazoline groups, (meth)acrylonitrile and styrene on the surface of said polyester film, then drying and stretching the film, and
   an ink jet receiving layer on said coating layer.

2. A coated film according to claim 1, wherein the copolymer is soluble in water.

3. A coated film according to claim 1, wherein the oxazoline equivalent of the copolymer is not more than 300 g/eq.

4. A coated film according to claim 1, wherein the coating solution contains at least one type of resin selected from polyester, polymer(s) of vinyl monomer and polyurethane.

5. A film according to claim 4, wherein the resin is polyester-polyurethane.

6. A film according to claim 4, wherein the resin is a composite of polyester and polymer of vinyl monomer, or a composite of polyurethane and polymer of vinyl monomer.

7. A film according to claim 1, wherein the polyester film is a polyethylene terephthalate film or a polyethylene-2,6-naphthalate film.

8. A film according to claim 1, wherein the copolymer or a reaction product of the copolymer is contained in a percentage of not more than 10% by weight based on the weight of the material for the polyester film.

9. A film according to claim 1, wherein the ink jet image receiving layer contains at least one of polymer selected from the group consisting of polyvinylalcohol, polyvinylpyrrolidone and polyvinylacetal.

10. A film according to claim 1, wherein the ink jet image receiving layer contains a derivative of aqueous cellulose.

11. A film according to claim 1, wherein the ink jet image receiving layer contains a gelatin.

* * * * *